US012025044B2

(12) United States Patent
Hattori et al.

(10) Patent No.: US 12,025,044 B2
(45) Date of Patent: Jul. 2, 2024

(54) HONEYCOMB CATALYST STRUCTURE AND SCR DEVICE (71) Applicant: MITSUI E&S Co., Ltd., Tokyo (JP)

(72) Inventors: Nozomu Hattori, Okayama (JP); Kousuke Ohara, Okayama (JP); Toshiharu Inaba, Okayama (JP)

(73) Assignee: MITSUI E&S CO., LTD., Tokyo (JP)

( * ) Notice: Subject to any disclaimer, the term of this patent is extended or adjusted under 35 U.S.C. 154(b) by 0 days.

(21) Appl. No.: 18/249,474

(22) PCT Filed: Aug. 10, 2021

(86) PCT No.: PCT/JP2021/029520
§ 371 (c)(1),
(2) Date: Apr. 18, 2023

(87) PCT Pub. No.: WO2022/085274
PCT Pub. Date: Apr. 28, 2022

(65) Prior Publication Data
US 2023/0392535 A1 Dec. 7, 2023

(30) Foreign Application Priority Data

Oct. 19, 2020 (JP) .................................. 2020-175623
Feb. 16, 2021 (JP) .................................. 2021-022742

(51) Int. Cl.
*F01N 3/28* (2006.01)
*B01J 21/06* (2006.01)
(Continued)

(52) U.S. Cl.
CPC ............ *F01N 3/2828* (2013.01); *B01J 21/06* (2013.01); *B01J 35/56* (2024.01); *F01N 3/2066* (2013.01);
(Continued)

(58) Field of Classification Search
CPC combination set(s) only.
See application file for complete search history.

(56) References Cited

U.S. PATENT DOCUMENTS

2004/0216451 A1* 11/2004 LaBarge ............... F01N 13/011
60/297
2012/0317947 A1* 12/2012 Okazaki ................. C04B 41/85
264/43
(Continued)

FOREIGN PATENT DOCUMENTS

JP 2003328734 11/2003
JP 2009039635 2/2009
(Continued)

OTHER PUBLICATIONS

WIPO, International Search Report for PCT/JP2021/029520, Sep. 28, 2021.

*Primary Examiner* — Binh Q Tran
(74) *Attorney, Agent, or Firm* — Hodgson Russ LLP (57) ABSTRACT The honeycomb catalyst structure to be used for exhaust gas of a marine engine includes an SCR catalyst supported on a metal honeycomb unit having a shape divided by cell walls into a plurality of cells extending from one end face to the other end face. The SCR catalyst contains $TiO_2$ alone, or contains $TiO_2$ as a principal component and any one type or two or more types of $V_2O_5$, $WO_3$, $MoO_3$, $SiO_2$, and $Al_2O_3$ in combination. The cell density of the plurality cells is 100 to 500 cpsi, and the slope of a straight line represented by a relationship between the flow velocity and the pressure loss of the exhaust gas passing through the cells is 30 or more and 180 or less.

4 Claims, 6 Drawing Sheets (51) Int. Cl.
  *B01J 29/08* (2006.01)
  *B01J 35/56* (2024.01)
  *F01N 3/08* (2006.01)
  *F01N 3/20* (2006.01)

(52) U.S. Cl.
  CPC ........... *B01D 2255/20723* (2013.01); *B01D 2255/50* (2013.01); *B01J 29/085* (2013.01); *F01N 3/0814* (2013.01); *F01N 3/0871* (2013.01); *F01N 3/206* (2013.01); *F01N 3/281* (2013.01); *F01N 2370/04* (2013.01); *F01N 2590/02* (2013.01)

(56) References Cited

U.S. PATENT DOCUMENTS

| | | | |
|---|---|---|---|
| 2016/0068441 A1* | 3/2016 | Backhaus-Ricoult | B01D 39/2068 264/681 |
| 2016/0136626 A1* | 5/2016 | Phillips | B01D 53/9477 422/171 |
| 2018/0250658 A1* | 9/2018 | Nakao | B01J 21/063 |
| 2019/0054456 A1* | 2/2019 | Boger | B01D 46/2484 |
| 2020/0384449 A1* | 12/2020 | Sung | B01J 29/7057 |

FOREIGN PATENT DOCUMENTS

| | | |
|---|---|---|
| JP | 2009202114 | 9/2009 |
| JP | 2009297691 | 12/2009 |
| JP | 5356064 | 12/2013 |
| WO | 2009141883 | 11/2009 |
| WO | 2014054607 | 4/2014 |

\* cited by examiner

HONEYCOMB CATALYST STRUCTURE AND SCR DEVICE

CROSS-REFERENCE TO RELATED APPLICATIONS

This application is a U.S. national stage entry of International Application No. PCT/JP2021/029520, filed Aug. 10, 2021, which claims priority to Japanese Patent Application No. 2020-175623, filed Oct. 19, 2020, and Japanese Patent Application No. 2021-022742, filed Feb. 16, 2021. The entire disclosures of the above-identified applications are incorporated by reference herein.

TECHNICAL FIELD

The present invention relates to a honeycomb catalyst structure and an SCR device, and in particular, relates to a honeycomb catalyst structure and an SCR device that have high reliability without being damaged by vibrations of a marine diesel engine, for example, and also in which a pressure loss is less likely to increase even if the number of cells is increased.

BACKGROUND

For example, as exhaust gas purification catalysts for marine diesel engines, selective catalytic reduction (SCR) denitration catalysts (hereafter referred to as SCR catalysts) are known as promising catalysts that can purify NOx.

A method in which a reducing agent is added to exhaust gas exhausted from a marine diesel engine and the resulting gas is subjected to catalytic reduction while passing through a denitration catalyst and is converted into harmless nitrogen and water is known as a urea-SCR method. This urea-SCR method is a method of rendering NOx harmless by injecting urea into a flow upstream of the denitration catalyst and subjecting the gas to the following reduction reaction (Patent Document 1).

(Reduction reaction)

Among exhaust gas purifiers using large SCR catalysts (also called SCR devices), especially for marine SCR devices, there is a need for downsizing in order to facilitate placement inside or outside ships, and there is also a need to make hydrolysis (vaporization) devices more compact.

Marine SCR devices need to be installed separately from engines due to their large size, which makes the layout in engine rooms very difficult. For this reason, an SCR device that is compact enough to enable an SCR reactor to be attached to a diesel engine and an SCR device in which an exhaust receiver and an SCR reactor are integrated into one unit have been developed.

However, a monolithic honeycomb catalyst manufactured by extruding ceramic as described in Patent Document 2 has a problem of being damaged by engine vibrations.

When the wall thickness of the honeycomb is increased and the number of cells is increased, the strength of the monolithic honeycomb can also be increased but the area of opening thereof accordingly decrease. This causes a greater pressure loss, resulting in a problem of inapplicability.

PRIOR ART DOCUMENTS

Patent Documents

Patent Document 1: JP-A-2003-328734
Patent Document 2: JP-B-5356064

SUMMARY OF THE INVENTION

Problem to be Solved by the Invention

In view of this, it is an object of the present invention to provide a honeycomb catalyst structure and an SCR device that have high reliability without being damaged by vibrations of a marine diesel engine, for example, and also in which a pressure loss is less likely to increase even if the number of cells is increased.

Furthermore, other objects of the present invention will become apparent upon reading the following description.

Means for Solving Problem

The above objects are achieved by each of the following inventions.

1. A honeycomb catalyst structure to be used for exhaust gas of a marine engine, in which an SCR catalyst is supported on a metal honeycomb unit having a shape divided by cell walls into a plurality of cells extending from one end face to the other end face along a longitudinal direction, wherein
   the SCR catalyst supported on the metal honeycomb unit contains $TiO_2$ alone, or contains $TiO_2$ as a principal component and any one type or two or more types of $V_2O_5$, $WO_3$, $MoO_3$, $SiO_2$, and $Al_2O_3$ in combination,
   the cell density of the cells is 100 to 500 cpsi, and
   the slope of a straight line represented by a relationship between a flow velocity of the exhaust gas passing through the cells and a pressure loss is 30 or more and 180 or less.
2. A honeycomb catalyst structure to be used for exhaust gas of a marine engine, in which an SCR catalyst is supported on a metal honeycomb unit having shape divided by cell walls into a plurality of cells extending from one end face to the other end face along a longitudinal direction, wherein
   material of the metal honeycomb unit is an alloy containing Fe as a principal component, Cr at 15 to 20 wt %, and Al at 2 to 5 wt %,
   the SCR catalyst supported on the metal honeycomb unit contains $TiO_2$ alone, or contains $TiO_2$ as a principal component and any one type or two or more types of $V_2O_5$, $WO_3$, $MoO_3$, $SiO_2$ or $Al_2O_3$ in combination, and
   the cell density of the cells is 100 and 500 cpsi.
3. The honeycomb catalyst structure to be used for exhaust gas of a marine engine according to 2, wherein the slope of a straight line represented by a relationship between a flow velocity and a pressure loss of the exhaust gas passing through the cells is 30 or more and 180 or less.
4. An SCR device comprising a honeycomb catalyst structure in which an SCR catalyst is supported on a metal honeycomb unit having a shape divided by cell walls into a plurality of cells extending from one end face to the other end face along a longitudinal direction, wherein
   the honeycomb catalyst structure is the honeycomb catalyst structure according to 1, 2 or 3, and is integrated into the marine engine.

Effect of the Invention

According to the present invention, it is possible to provide the honeycomb catalyst structure and the SCR device that have high reliability without being damaged by vibrations of the marine diesel engine, for example, and also in which the pressure loss is less likely to increase even if the number of the cells is increased.

DESCRIPTION OF THE PREFERRED EMBODIMENTS

An embodiment of the present invention will now be described with reference to the drawings.

An SCR device of the present invention includes a honeycomb catalyst structure having a unique configuration of the present invention, in which an SCR catalyst is supported on a metal honeycomb unit having a shape divided by cell walls into a plurality of cells extending from one end face to the other end face along a longitudinal direction.

A conventional ceramic-type monolithic honeycomb catalyst described in Patent Document 2 has a problem of being damaged by vibrations when being in direct contact with a marine diesel engine. However, in the SCR device of the present invention, even if it is disposed so as to be in direct contact with a marine diesel engine, the honeycomb catalyst structure having the unique configuration of the present invention can continuously perform denitration without being damaged by vibrations of the marine diesel engine.

Figure 1:
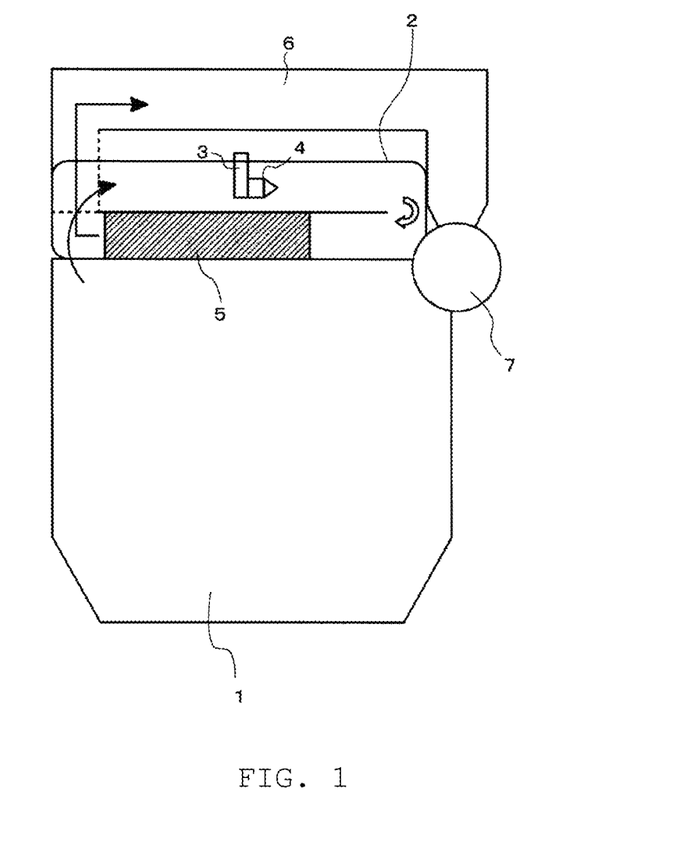
FIG. 1 is a schematic flow diagram illustrating an example of a diesel engine including an SCR device according to the present invention.
Figure 2:
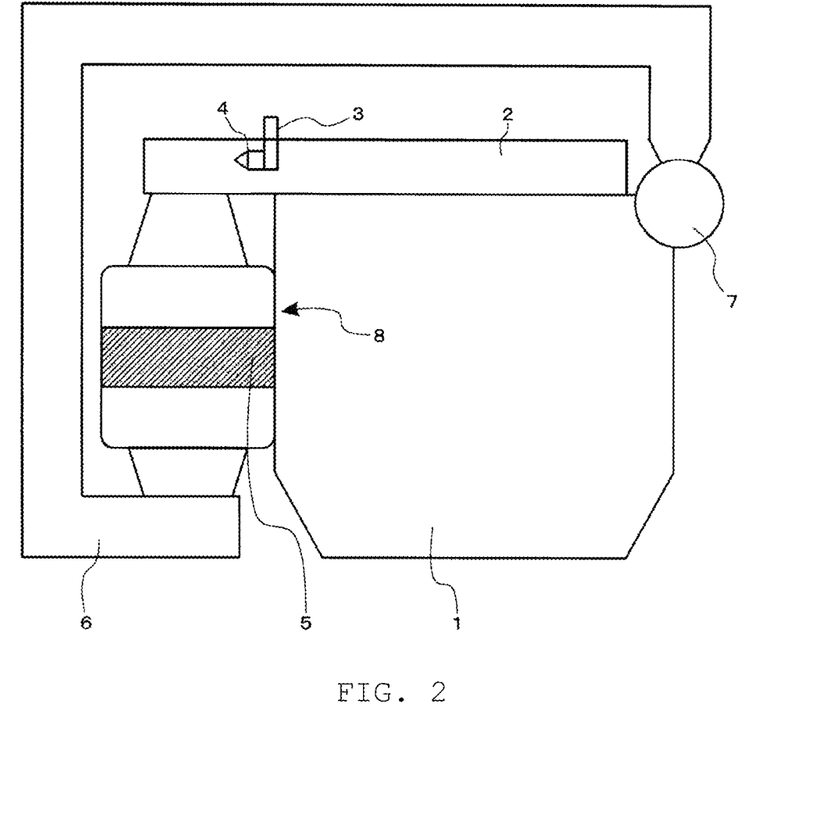
FIG. 2 is a schematic flow diagram illustrating another example of the diesel engine including the SCR device according to the present invention

Types of the SCR device disposed so as to be in direct contact with the marine diesel engine are illustrated in FIG. 1 and FIG. 2.

FIG. 1 is a schematic flow diagram illustrating an example of the diesel engine including the SCR device according to the present invention.

In FIG. 1, the numeral "1" denotes a diesel engine body, which is used in the marine diesel engine, for example.

The numeral "2" denotes a receiver tank that receives and stores exhaust gas sent from the diesel engine body 1, and serves as a buffer tank that absorbs a fluctuation in the amount of exhaust gas sent from the diesel engine body 1, for example. The receiver tank 2 also serves as piping 2 for exhaust gas.

The diesel engine illustrated in FIG. 1 is an example of a compact diesel engine in which the diesel engine body 1 and the SCR device including a denitration unit 5 provided to the receiver tank 2 are integrated into one unit. In the present embodiment, the SCR device is disposed so as to be in direct contact with the engine body 1 and is provided in a position where engine vibrations are transmitted.

Into the receiver tank 2, a urea-solution supply pipe 3 for supplying pressurized air (compressed air) and a urea solution is disposed, and a urea-solution spray nozzle 4 is provided near a tip of the urea-solution supply pipe 3. The urea-solution spray nozzle 4 is configured to be able to spray the urea solution into the receiver tank 2.

In the receiver tank 2, downstream of the urea-solution spray nozzle 4, a urea-solution hydrolysis unit (not illustrated) may be provided.

The hydrolysis unit is preferably provided with a hydrolysis catalyst. The hydrolysis catalyst can promote hydrolysis of urea and decrease the amount of urea to be sent to the SCR catalyst described later, thereby decreasing formation of urea-derived solids in the SCR honeycomb catalyst.

The urea solution sprayed by the urea-solution spray nozzle 4 and/or the NH 3 produced by hydrolysis in the hydrolysis unit is sent with the exhaust gas to the denitration unit 5.

The denitration unit 5 is provided with an SCR catalyst supported on a metal honeycomb serving as a support. In the denitration unit 5, when exhaust gas containing NH 3 and NOx produced by the hydrolysis of urea has been introduced, the NOx is reduced by the action of the SCR catalyst to produce nitrogen gas (N 2), whereby denitration treatment is performed.

The treated gas thus denitrated is returned for reuse to a turbocharger 7 through treated-gas piping 6.

FIG. 2 is a schematic flow diagram illustrating another example of the diesel engine including the SCR device according to the present invention.

In FIG. 2, parts designated by the same numerals as in FIG. 1 are the same as those in FIG. 1, and thus description thereof is omitted.

The diesel engine illustrated in FIG. 2 is an example of a compact diesel engine in which the diesel engine body 1 and the SCR device 8 are provided separately but are in contact with each other.

In FIG. 2, the receiver tank 2 extends to an inlet of the SCR device 8. The SCR device 8 is disposed such that it is in contact with the diesel engine body 1 and vibrations of the engine are transmitted thereto. This can contribute to downsizing of the diesel engine. The SCR device 8 is provided with the denitration unit 5. The treated gas thus denitrated is returned for reuse to the turbocharger 7 through the treated piping 6.

Figure 3:
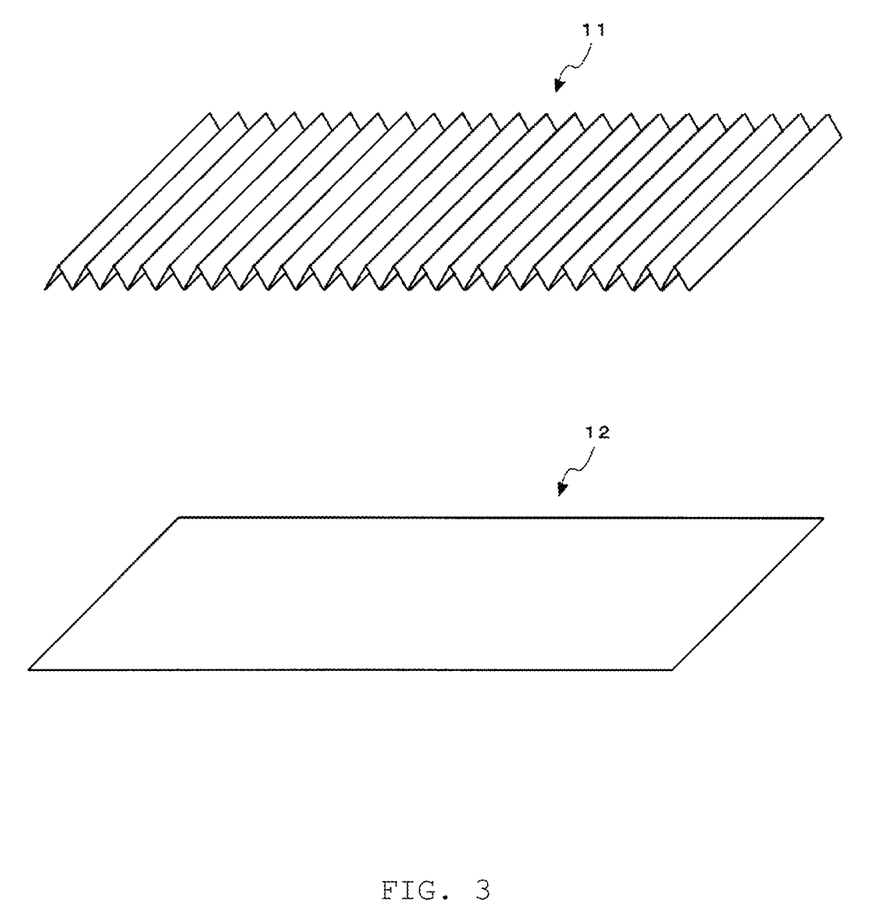
FIG. 3 is an exploded perspective view illustrating an example of a metal honeycomb unit including a metal corrugated plate having a triangular cross-section and a metal flat plate.
Figure 4:
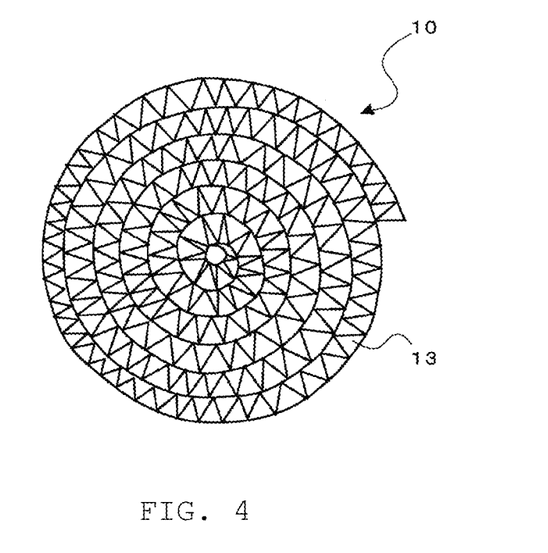
FIG. 4 is a sectional view of a principal part of a honeycomb catalyst structure according to the present invention.

The following describes an example of the honeycomb catalyst structure of the denitration unit 5 used in the SCR device with reference to FIG. 3 and FIG. 4.

The numeral "10" in FIG. 4 denotes a metal honeycomb unit. The metal honeycomb unit 10 includes a metal corrugated plate 11 having a triangular cross-section and a metal flat plate 12 illustrated in FIG. 3.

The metal corrugated plate 11 and the metal flat plate 12 are brazed together to form a honeycomb substrate (not illustrated). The honeycomb substrate is then spirally wound to form the metal honeycomb unit 10.

The diameter of the metal honeycomb unit 10 can be adjusted appropriately in accordance with the number of windings of the honeycomb substrate, as long as the metal honeycomb unit 10 can be attached to the piping 2 for exhaust gas.

FIG. 4 illustrates a state in which the metal honeycomb unit 10 provided to the piping 2 for exhaust gas is spirally wound.

Figure 5:
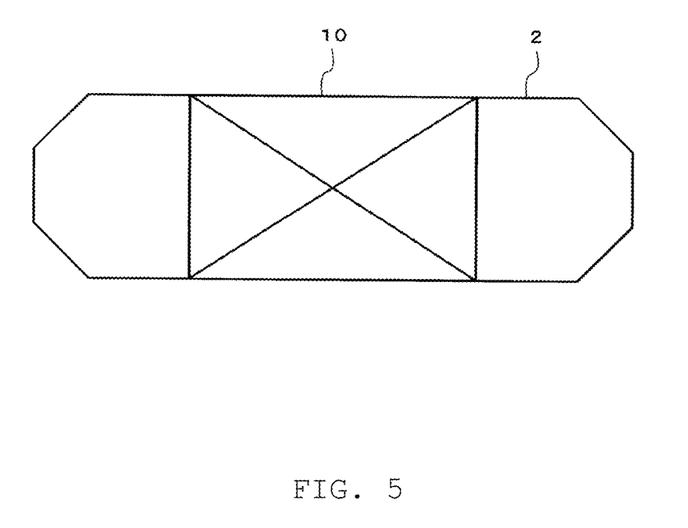
FIG. 5 is a schematic diagram illustrating a state in which the honeycomb catalyst structure according to the present invention is attached to an exhaust gas pipe.

The metal honeycomb unit 10 has a configuration including cells extending from one end face to the other end face along the longitudinal direction (left-and-right direction in FIG. 5).

As illustrated in FIG. 4, in the metal honeycomb unit 10, a plurality of the cells 13 divided by cell walls and each having a triangular cross-section are formed.

The cells 13 each having a triangular cross-section extend and penetrate from one end to the other end along the longitudinal direction (left-and-right direction in FIG. 5), so that exhaust gas can pass through the cells and come into contact with the catalyst while passing therethrough.

In the above example, the shape of each cell is triangular in cross section, but is not limited to a particular one. The cell may have any of a semicircular cross-section, an elliptical cross-section, a quadrangular cross-section, and a polygonal cross-section, for example.

The materials of the metal corrugated plate 11 and the metal flat plate 12, which constitute the metal honeycomb unit 10, are preferably made of an alloy containing Fe as a main component, Cr at 15 to 20 wt %, and Al at 2 to 5 wt % (an alloy containing Cr at 15 to 20 wt % and Al at 2 to 5 wt % with a remainder of Fe and unavoidable impurities). With this composition, the metal honeycomb unit 10 constituted by the metal corrugated plate 11 and the metal flat plate 12 is excellent in strength, vibration resistance, and heat resistance.

In particular, during brazing of the honeycomb unit 10 or during firing of SCR, a temperature reaches about 1000° C. In this case, the Cr content of 15 to 20 wt % allows formation of the honeycomb unit 10 having excellent heat resistance.

The presence of Al provides excellent corrosion resistance because aluminum oxide is formed on an outermost surface of the honeycomb unit when heated at high temperature. For example, because exhaust gas from marine engines has a higher sulfur (S) content in the fuel and chlorine (Cl) is easily mixed thereinto, a higher Al content tends to make the honeycomb unit less likely to corrode. Thus, for the honeycomb unit, the content of Al is preferably within a range of 2 to 5 wt % when balance is considered in terms of strength, vibration resistance, heat resistance, and corrosion resistance.

In the present invention, the cell density is 50 to 500 cpsi, preferably 80 to 500 cpsi, more preferably 100 to 500 cpsi, and even more preferably 100 to 400 cpsi. A cell density within this range has such effects that the honeycomb catalyst structure can be made compact and the pressure loss can be kept within a range that does not impair the performance of an engine including a turbocharger.

Figure 7:
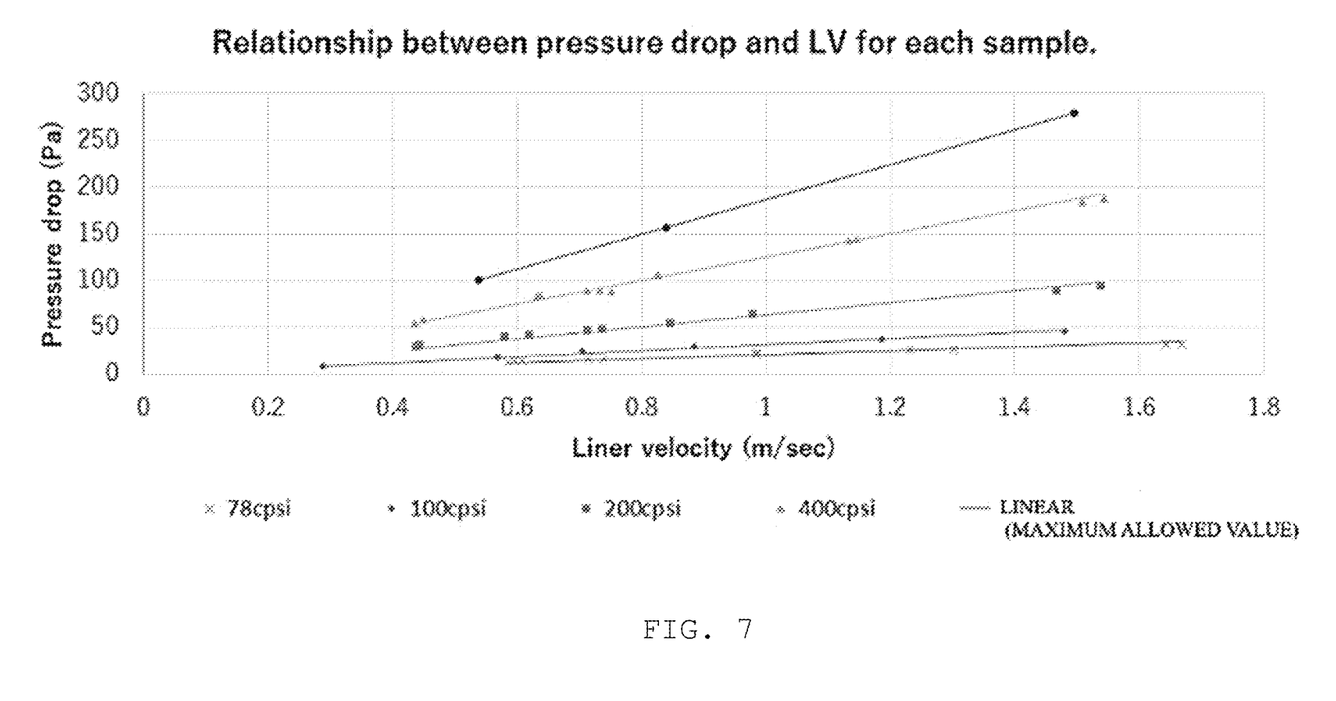
FIG. 7 is a graph illustrating a relationship between linear velocity LV and pressure loss.

In the present embodiment, a relationship between linear velocity LV and pressure loss, which was determined in examples described later, is illustrated in FIG. 7. In FIG. 7, a graph of linear velocity LV versus pressure loss at respective cell densities of 78 cpsi, 100 cpsi, 200 cpsi, 300 cpsi, 400 cpsi, and 500 cpsi is illustrated. The slope of the straight line at each cell density in this graph is preferably 30 or more and 180 or less.

When the slope of the straight line represented by the relationship between the flow velocity (linear velocity LV) and the pressure loss of exhaust gas passing through the cells is 30 or more and 180 or less, an optimal cell density based on the pressure loss in the cells can be set in consideration of the performance of the engine with the turbocharger, as well as the honeycomb catalyst structure can be made compact as described above.

In the present invention, the SCR catalyst, which is a carrier, is supported on the support forming the metal honeycomb unit 10 provided to the denitration unit 5.

The SCR catalyst contains $TiO_2$ as a principal component. The content of $TiO_2$ is preferably 50 vol % or more. This is because it is excellent in functionality as an SCR catalyst.

The SCR catalyst preferably contains, in addition to $TiO_2$, any one type or two or more types of $V_2O_5$, $WO_3$, $MoO_3$, $SiO_2$, and $Al_2O_3$ in combination.

The method of supporting the SCR catalyst on the support is not limited to a particular one, but the impregnation method is preferred.

EXAMPLES

The following describes Examples of the present invention. However, the present invention is not limited to the Examples.

Example 1

The SCR device illustrated in FIG. 1 was used. The honeycomb catalyst structures with the SCR catalyst supported on the support forming the metal honeycomb unit 10 illustrated in FIGS. 3, 4, and 5 were also used.

The cross-sectional shape of each of the cells is an isosceles triangle.

The following four honeycomb catalyst structures were prepared.

Honeycomb catalyst structure A: cell density 80 cpsi
Honeycomb catalyst structure B: cell density 130 cpsi
Honeycomb catalyst structure C: cell density 300 cpsi
Honeycomb catalyst structure D: cell density 400 cpsi Exhaust gas at 350° C. was fed to the SCR device, and denitration experiments were conducted with the respective honeycomb catalyst structures A to D listed above.

Figure 6:
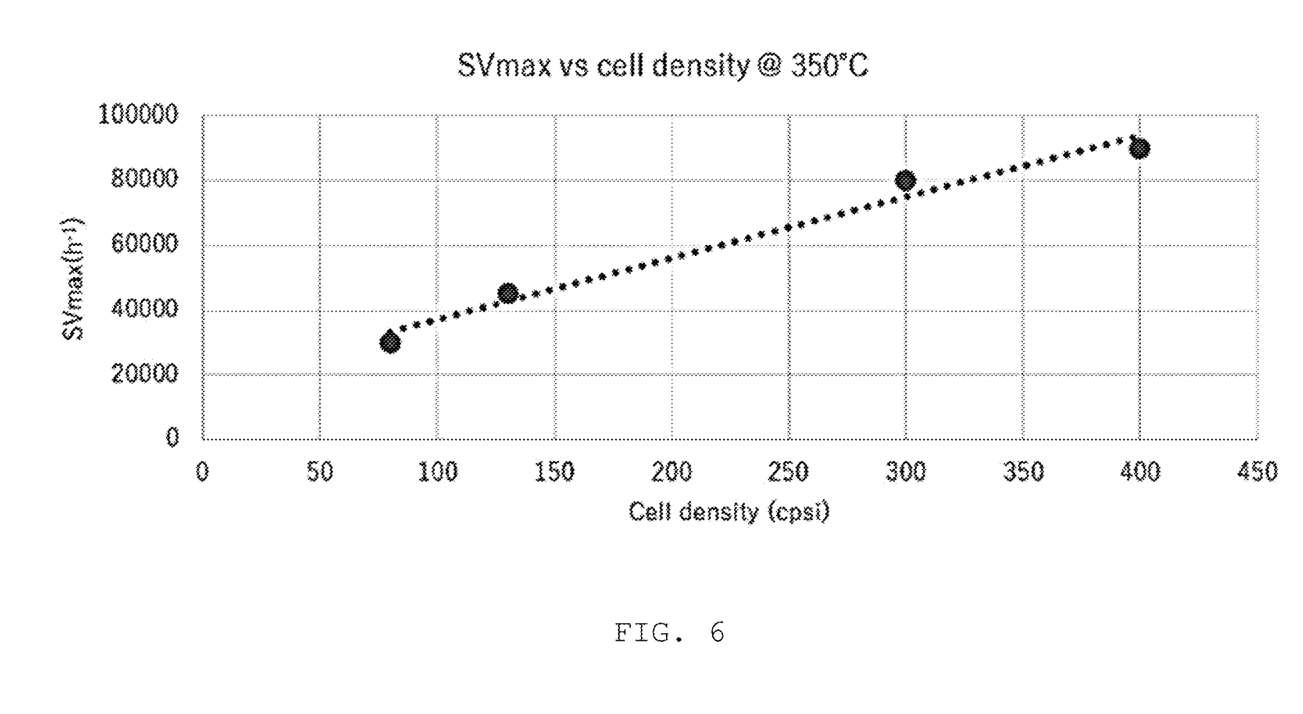
FIG. 6 is a graph illustrating a relationship between the maximum SV and the number of cells that satisfy a required performance.

In each experiment, the relationship between the maximum SV ($h^{-1}$) and the cell density was determined. The results are illustrated in FIG. 6. Herein, the SV is calculated as gas flow rate/catalyst volume.

From the results of the experiments, it is found that a cell density of 100 cpsi or more improves denitration performance and enables the SCR device to be made compact.

Example 2

The following four honeycomb catalyst structures were prepared such that a cell density is less than 500 cpsi, and denitration experiments were conducted.

Honeycomb catalyst structure E: cell density 78 cpsi
Honeycomb catalyst structure F: cell density 100 cpsi
Honeycomb catalyst structure G: cell density 200 cpsi
Honeycomb catalyst structure H: cell density 400 cpsi In each experiment, the relationship between the linear velocity LV and the pressure loss was determined. Each relationship is illustrated in FIG. 7.

The linear velocity LV is a gas flow velocity (m/sec) measured as (the flow rate of exhaust gas flowing through each cell)/(cell cross-sectional area).

The pressure loss was calculated from the gas pressures at the inlet and the outlet of the honeycomb catalyst structure. The unit of the result thus determined is the pascal (Pa).

From the results of the experiments, it is found that the pressure loss increases as the number of cells increases. It is found that a cell density of 500 cpsi or less is appropriate to prevent the engine performance from being impaired.

EXPLANATIONS OF LETTERS OR NUMERALS 1 diesel engine body
2 receiver tank (piping for exhaust gas)
3 urea-solution supply pipe
4 urea-solution spray nozzle
5 denitration unit
6 treated-gas piping
7 turbocharger
8 SCR device
10 metal honeycomb unit
11 metal corrugated plate
12 metal flat plate
13 cell

The invention claimed is:

1. A honeycomb catalyst structure to be used for exhaust gas of a marine engine, comprising a selective catalytic reduction (SCR) catalyst supported on a metal honeycomb unit having a shape divided by cell walls into a plurality of cells extending from one end face to the other end face along a longitudinal direction, wherein:
the SCR catalyst supported on the metal honeycomb unit contains $TiO_2$ alone, or contains $TiO_2$ as a principal component and any one type or two or more types of $V_2O_5$, $WO_3$, $MoO_3$, $SiO_2$, and $Al_2O_3$ in combination,
a cell density of the plurality of cells is 100 to 500 cpsi, and
a slope of a straight line represented by a relationship between a flow velocity of the exhaust gas passing through the plurality of cells and a pressure loss is 30 or more and 180 or less.

2. A honeycomb catalyst structure to be used for exhaust gas of a marine engine, comprising a selective catalytic reduction (SCR) catalyst supported on a metal honeycomb unit having shape divided by cell walls into a plurality of cells extending from one end face to the other end face along a longitudinal direction, wherein:
a material of the metal honeycomb unit is an alloy containing Fe as a principal component, Cr at 15 to 20 wt %, and Al at 2 to 5 wt %,
the SCR catalyst supported on the metal honeycomb unit contains $TiO_2$ alone, or contains $TiO_2$ as a principal component and any one type or two or more types of $V_2O_5$, $WO_3$, $MoO_3$, $SiO_2$ or $Al_2O_3$ in combination,
a cell density of the plurality of cells is 100 to 500 cpsi, and
a slope of a straight line represented by a relationship between a flow velocity and a pressure loss of the exhaust gas passing through the plurality of cells is 30 or more and 180 or less.

3. An SCR device comprising the honeycomb catalyst structure of claim 2, wherein the honeycomb catalyst structure is integrated into the marine engine.

4. An SCR device comprising the honeycomb catalyst structure of claim 1, wherein the honeycomb catalyst structure is integrated into the marine engine.

* * * * *